US007139158B2

(12) United States Patent
Niayesh et al.

(10) Patent No.: US 7,139,158 B2
(45) Date of Patent: Nov. 21, 2006

(54) METHOD AND APPARATUS FOR CURRENT LIMITING BY MEANS OF A LIQUID METAL CURRENT LIMITER

(75) Inventors: Kaveh Niayesh, Teheren (IR); Friedrich Koenig, Oberbözberg (CH)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 11/328,181

(22) Filed: Jan. 10, 2006

(65) Prior Publication Data

US 2006/0171089 A1 Aug. 3, 2006

Related U.S. Application Data

(63) Continuation of application No. PCT/CH2004/000416, filed on Jul. 1, 2004.

(30) Foreign Application Priority Data

Jul. 10, 2003 (EP) ................................ 03405518

(51) Int. Cl.
*H02H 9/08* (2006.01)

(52) U.S. Cl. .................................................... 361/93.9

(58) Field of Classification Search ................ 361/93.9
See application file for complete search history.

(56) References Cited

U.S. PATENT DOCUMENTS 4,598,332 A * 7/1986 Kemeny
4,599,671 A * 7/1986 Kemeny et al.
5,896,264 A * 4/1999 Bijlenga et al. ............ 361/106
6,714,115 B1 * 3/2004 Kremers et al. .............. 337/21
6,850,145 B1 * 2/2005 Kremers et al. .............. 337/21

FOREIGN PATENT DOCUMENTS

| | | | | |
|---|---|---|---|---|
| DE | 1 294 858 | | * | 5/1969 |
| DE | 1 206 786 | | * | 9/1970 |
| DE | 25 15 008 | | * | 9/1976 |
| DE | 26 52 506 | A1 | * | 5/1978 |
| DE | 40 12 385 | A1 | * | 3/1991 |
| DE | 199 03 939 | A1 | * | 8/2000 |
| SU | 1 1529303 | A1 | * | 12/1989 |

* cited by examiner

*Primary Examiner*—Stephen W. Jackson
*Assistant Examiner*—Ann T. Hoang
(74) *Attorney, Agent, or Firm*—Buchanan Ingersoll & Rooney PC

(57) ABSTRACT

A method and an apparatus are disclosed for current limiting, as is a switchgear assembly having an apparatus such as this. Liquid metal is passed along a resistance element for the current limiting path, in order to achieve current limiting without any arcs for network-dependent short-circuit currents. Exemplary embodiments relate, inter alia, to: an electrical resistance, which rises non-linearly in the movement direction of the liquid metal for a soft current limiting characteristic, a resistance element in the form of a dielectric matrix having channels for the liquid metal, and a combined current limiter circuit breaker. Advantages are, inter alia, reversible current limiting and possibly current disconnection without arcs, also suitable for high voltages and currents, fast reaction times, low wear, and maintenance-friendliness.

13 Claims, 3 Drawing Sheets

METHOD AND APPARATUS FOR CURRENT LIMITING BY MEANS OF A LIQUID METAL CURRENT LIMITER

This application claims priority under 35 USC § 119 to European Application No. 03405518.6 filed Jul. 10, 2003 and is a Continuation under 35 USC § 120 of International Application No. PCT/CH2004/000416, filed Jul. 1, 2004, the contents of which are incorporated by reference herein in their entireties.

TECHNICAL FIELD

The invention relates to the field of primary technology for electrical switchgear assemblies, in particular for fault current limiting in high-, medium- and low-voltage switchgear assemblies. It is based on a method and an apparatus for current limiting, and on a switchgear assembly having an apparatus such as this, as claimed in the precharacterizing clause of the independent patent claims.

BACKGROUND

DE 199 03 939 A1 discloses a self-recovering current limiting device with liquid metal. A pressure-resistant insulating housing is arranged between two solid metal electrodes, in which housing liquid metal is arranged in compressor areas and in connecting channels which are located between them and connect the compressor areas, thus resulting in a current path for nominal currents between the solid electrodes. The current path in the connecting channels is narrower than in the compressor areas. The connecting channels are severely heated when short-circuit currents occur, and emit a gas. Avalanche-like gas bubble formation in the connecting channels results in the liquid metal vaporizing into the compressor areas, so that a flow-limiiting arc is struck in the connecting channels, in which there is now no liquid metal. Once the overcurrent has decayed, the liquid metal can condense again, and the current path is ready to operate again.

WO 00/77811 discloses a development of the self-recovering current limiting device.

The connecting channels broaden conically upwards so that the filling level of the liquid metal can be varied, and the rated current carrying capacity can be changed over a wide range. Furthermore, the offset arrangement of the connecting channels results in the formation of a meandering current path, so that a series of current-limiting arcs are struck when the liquid metal vaporizes as a result of overcurrents. Pinch effect current limiters such as these require a very stable design in terms of pressure and temperature, which involves a complex design. The use of arcs for current limiting results in high wear in the interior of the current limiter, and erosion residues can contaminate the liquid metal. The recondensation of the liquid metal immediately after a short circuit results in a conductive state again, so that no disconnected state is provided.

DE 40 12 385 A1 discloses a current-controlled disconnection apparatus whose functional principle is based on the pinch effect with liquid metal. A single, narrow channel that is filled with liquid metal is arranged between two solid metal electrodes. When an overcurrent occurs, the liquid conductor is drawn together by the pinch effect as a result of the electromagnetic force, so that the current itself constricts the liquid conductor, and disconnects it. The displaced liquid metal is gathered in a supply container, and flows back again after the overcurrent event. The contacts are disconnected without any arcs. However, the device is suitable for only relatively small currents, low voltages and slow disconnection times, and does not offer a permanent disconnected state.

DE 26 52 506 discloses an electric heavy-current switch with liquid metal. On the one hand, a liquid metal mixture is used in order to wet the solid metal electrodes and in order to reduce the contact resistance. In this case, the liquid metal is driven by mechanical displacement, for example by moving contacts or pneumatically driven plunger-type pistons, against the force of gravity into the contact gap. The liquid metal can additionally be stabilized and held fixed in the contact gap by a pinching effect, on the basis of which a current-carrying conductor experiences radial striction as a result of the current flowing through it. External magnetic fields and stray magnetic fluxes, for example resulting from the electrical power supplies, can cause flow instabilities in the liquid metal and are shielded, and may be permitted during disconnection in order to assist the quenching of the arc in the liquid metal. This has the disadvantage that gradual current limiting is not possible, and arcs between the solid electrodes cause oxidation in the liquid metal. The design of the heavy-current switch includes seals for liquid metal, inert gas or a vacuum, and is correspondingly complex.

GB 1 206 786 discloses an electrical heavy-current switch based on liquid metal as claimed in the precharacterizing clause of the independent claims. In a first position, the liquid metal forms a first current path for the operating current and is passed along a resistance element during current switching, and is moved to a second position in which it is connected in series with the resistance element and reduces the current to a small fraction. The heavy-current switch is designed to produce high-intensity current pulses in the megaampere and submillisecond range for plasma generation.

SUMMARY

One object of the present invention is to specify a method, an apparatus and an electrical switchgear assembly having an apparatus such as this for improved and simplified current limiting.

In a first aspect, the invention comprises a method for current limiting by means of a current limiting apparatus which has solid electrodes and a container with at least one channel for a liquid metal, in which an operating current is carried on a first current path through the current limiting apparatus between the solid electrodes and the first current path is at least partially passed through the liquid metal, which is located in a first position, in a first operating state, in which the liquid metal is moved along a movement direction to at least one second position in a second operating state, and is passed along a resistance element during the transition from the first position to the second position, and is connected in series with a resistance element in the at least one second position and in consequence a current-limiting second current path is formed through the current limiting apparatus and has a predeterminable electrical resistance, in which the resistance element is purely resistive, and the electrical resistance, in order to achieve a soft disconnection characteristic, rises non-linearly and continuously with the second position, wherein, in logarithmic representation, the electrical resistance as a function of the second position first of all increases more than proportionally with the second position and then rises linearly with the second position in a phase in which the energy which is stored in a network inductance must be absorbed, and then, in a region in which the short-circuit current is already limited and greater electrical resistances are tolerable, changes once again to a steeper, that is to say more than proportionally rising function of the second position. This results in a soft current limiting characteristic for progressive current limiting.

In particular, the electrical resistance is chosen as a function of the second position, and the distance/time characteristic of the liquid metal along the movement direction is chosen such that in every second position of the liquid metal, the product of the electrical resistance and of the current is less than an arc striking voltage between the liquid metal and the solid electrodes and intermediate electrodes, and an adequate current limiting gradient is achieved to cope with network-dependent short-circuit currents.

Such a current limiting method is suitable for limiting network-dependent short circuits. According to the invention, the liquid metal remains in the liquid aggregate state and is moved deliberately between the different positions by a forced movement. The pinch effect is not used in this case. Very fast current limiting reaction times down to less than 1 ms can be achieved. The method specifies design criteria for optimum design of the dynamics of the current limiting process. Since a suitably designed electrical resistance is wetted and made contact with by the liquid metal, rather than an isolator, when current limiting is taking place, no arcs are struck. The current limiting method can therefore also be used at very high voltage levels. In the process, scarcely any wear occurs as a result of erosion or corrosion of the liquid metal. The current limiting process takes place reversibly and is thus maintenance-friendly and cost-effective.

An exemplary embodiment has the advantage of a compact arrangement of the liquid metal relative to the current paths to be switched.

Another exemplary embodiment has the advantage that alternate series connection of liquid metal columns to a dielectric means that even high voltages and high currents can be handled efficiently and safely.

Particularly simple configurations for a current-limiting switch or current limiter with an integrated switch based on liquid metal are also disclosed.

Current limiting which is advantageous because it is autonomous and at the same time self-recovering is also disclosed.

A further aspect of the invention relates to an apparatus for current limiting, in particular for carrying out the method, having solid electrodes and a container with at least one channel for a liquid metal, in which a first current path for an operating current is provided through the current limiting apparatus between the solid electrodes in a first operating state, and the first current path passes at least partially through the liquid metal which is located in a first position, in which electrical resistance means with a predeterminable electrical resistance are provided, positioning means are provided for movement and for spatial positioning of the liquid metal along a movement direction along the resistance means to at least one second position, and the liquid metal is connected at least partially in series with the resistance means in a second operating state, and forms a second current path together with it, on which the operating current can be limited to a current to be limited, in which the resistance element is purely resistive, and the electrical resistance, in order to achieve a soft disconnection characteristic, rises non-linearly and continuously with the second position, wherein in logarithmic representation, the electrical resistance as a function of the second position first of all increases more than proportionally with the second position and then rises linearly with the second position in a phase in which the energy which is stored in a network inductance must be absorbed, and then, in a region in which the short-circuit current is already limited and greater electrical resistances are tolerable, changes once again to a more than proportionally rising function of the second position. In particular, the electrical resistance is designed to be a function of the second position and the positioning means have a distance/time characteristic of the liquid metal along the movement direction such that in every second position of the liquid metal, the product of the electrical resistance and of the current is less than an arc striking voltage between the liquid metal and the solid electrodes and intermediate electrodes, and an adequate current limiting gradient is achieved to cope with network-dependent short-circuit currents.

BRIEF DESCRIPTION OF THE DRAWINGS

Further embodiments, advantages and applications of the invention will be apparent from the description that now follows and the figures.

Identical parts are provided with the same reference symbols in the figures.

DETAILED DESCRIPTION

Figure 1A:
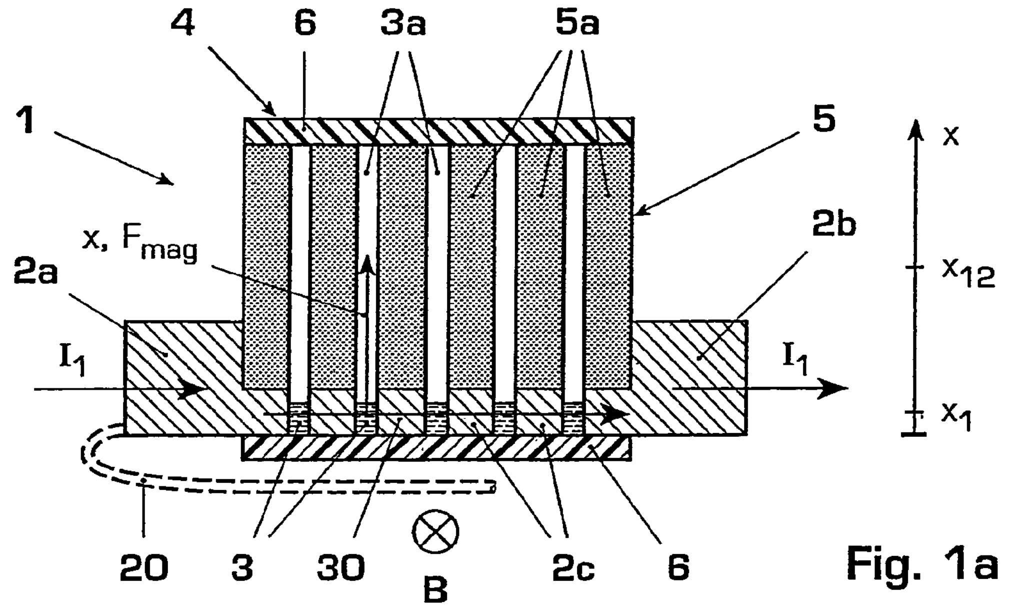
FIGS. 1*a*, 1*b* show a current limiting device with liquid metal according to the invention for rated current operation and when the current is being limited.
Figure 1B:
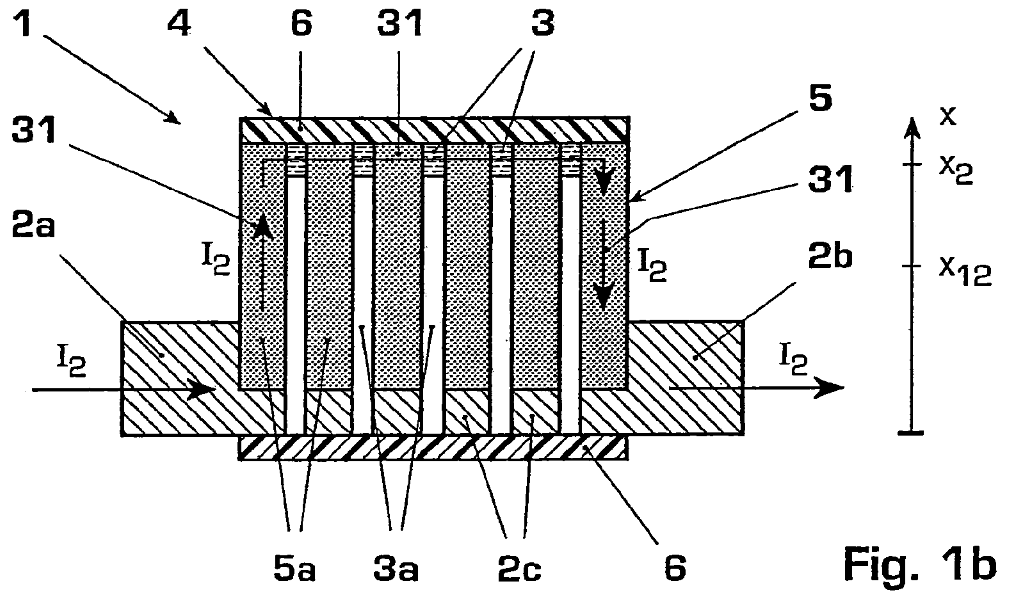

FIGS. 1*a*, 1*b* show an example of a liquid metal current limiter 1. The current limiter 1 has solid metal electrodes 2*a*, 2*b* and intermediate electrodes 2*c* for a current supply 20, and has a container 4 for the liquid metal 3. The container 4 has a base 6 and a cover 6 composed of insulating material, between which an electrical resistance means 5 having at least one channel 3*a* for the liquid metal 3 is arranged. For example, a barrier gas, an insulating liquid (with an escape volume that is not illustrated here), or a vacuum may be arranged, for example, above the liquid metal column 3.

In a first operating state (FIG. 1*a*), an operating current or rated current $I_1$ flows on a rated current path 30 from the input electrode 2*a* via the liquid metal 3 and possibly intermediate electrodes 2*c* to the output electrode 2*b*. In this case, the liquid metal 3 is in the first position $x_1$, at least partially wets the solid electrodes 2*a*, 2*b*, 2*c* and electrically conductively bridges the channels 3*a*. In a second operating state (FIG. 1*b*), the liquid metal 3 has moved along the movement direction x, defined by the height extent for the channels 3*a*, to a second position $x_2$ where it is in series with the electrical resistance means 5 and together with this means forms a second current or current limiting path 31 for a current $I_2$ that is to be limited. For a particularly compact arrangement, the rated current path 30 and the current-limiting second current path 31 are arranged in parallel to one another and they are both arranged, at right angles to the height extent of the channels 3*a*, at a variable height which can be predetermined by the second position $x_{12}$, $x_2$ of the liquid metal 3. A typical minimum arc striking voltage of 10 V–20 V, which is dependent on the contact material, should not be exceeded for arc-free commutation of the current i(t) from the solid electrodes 2*a*, 2*b*, 2*c* to the resistance element 5.

The resistance means 5 preferably comprises a dielectric matrix 5, which has wall-like webs 5*a* for dielectric isolation of a plurality of channels 3*a* for the liquid metal 3, with the webs 5*a* having a dielectric material with a resistance $R_x$ which increases non-linearly in the movement direction x. The webs 5*a* should have intermediate electrodes 2*c* at the height of the first position $x_1$ of the liquid metal 3, for electrically conductive connection of the channels 3*a*. The channels 3*a* are preferably arranged essentially parallel to one another. The wall-like webs 5*a* represent individual resistances 5*a* of the resistance element 5, so that the current-limiting second current path 31 is formed by alternating series connection of the channels 3*a* and of the individual resistances 5*a*.

Figure 6:
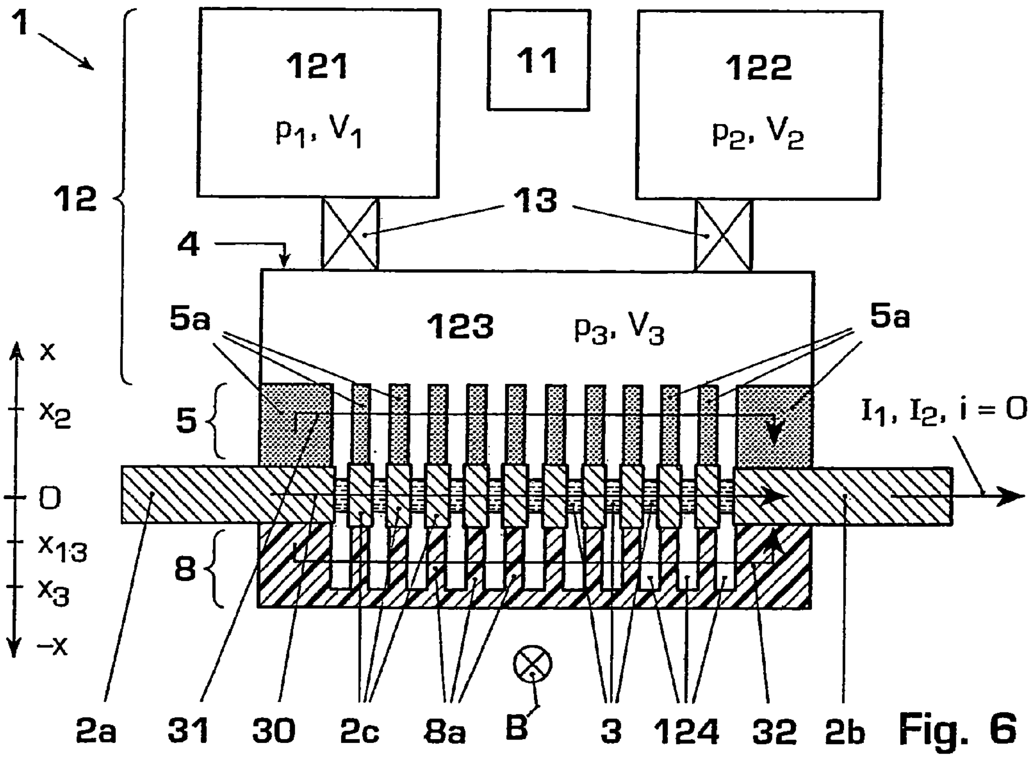
FIG. 6 shows a combined liquid metal current limiter and liquid metal circuit breaker with a gas drive for the liquid metal.

The positioning means 3*a*; 20, B, 12 for movement and spatial positioning of the liquid metal 3 along a movement direction x to at least one second position $x_{12}$, $x_2$ comprise the channels 3*a* and a transport or drive means 20, B, 12 for the liquid metal 3, and in particular also a drive controller 11 (as illustrated in FIG. 6). An electromagnetic drive 20, B or a mechanical drive with a dielectric fluid 12 is preferably provided, by means of which the liquid metal 3 can be moved between the rated current path 30 and the current limiting path 31.

During a transition from the first position $x_1$ to the second position $x_{12}$, $x_2$, in particular to an extreme second position $x_2$, the liquid metal 3 is moved along the resistance element 5. In order to achieve a soft disconnection characteristic, the resistance element 5 has an electrical resistor $R_x$, an electrical resistance $R_x$, which rises non-linearly along the movement direction x of the liquid metal 3, for the second current path 31. The resistance element 5 should have a resistive component and is preferably purely resistive with an electrical resistance $R_x$ which rises continuously with the second position $x_{12}$, $x_2$.

The second operating state is typically initiated by an overcurrent. The current limiting is preferably activated autonomously, in particular by electromagnetic force $F_{mag}$ which acts on the liquid metal 3 though which the current is flowing, with the liquid metal 3 being arranged in an external magnetic field B or in an internal magnetic field B which is produced by a current supply 2*a*, 2*b*; 20.

Figure 2:
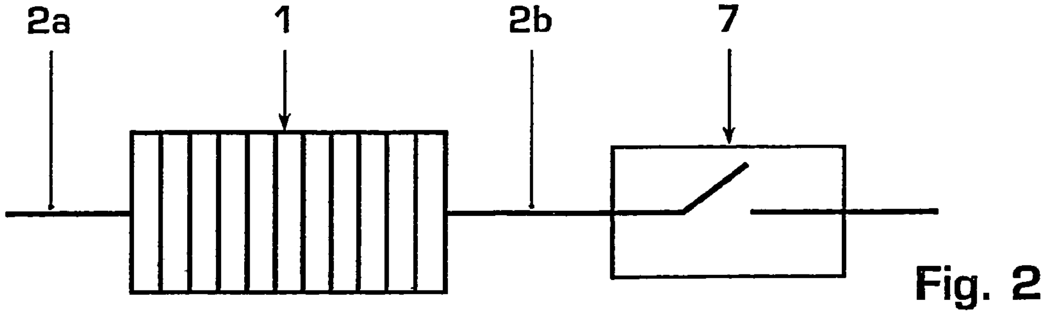
FIG. 2 shows a current-limiting switch in the form of a liquid metal current limiter and a switch arranged in series.

FIG. 2 shows the current limiter 1 according to the invention connected in series with an electrical switch 7, in particular a circuit breaker 7. A current-limiting switch 1, 7 is provided in this arrangement, in which the current limiting takes place primarily conventionally by means of the method according to the invention with liquid metal 3 followed by current disconnection. If the liquid metal 3 is driven electromagnetically, two current limiters 1 can also be connected in series with the liquid metal movement being initiated effectively in antiphase in order to achieve current limiting, and if necessary current disconnection, in each current half-cycle.

Figure 3:
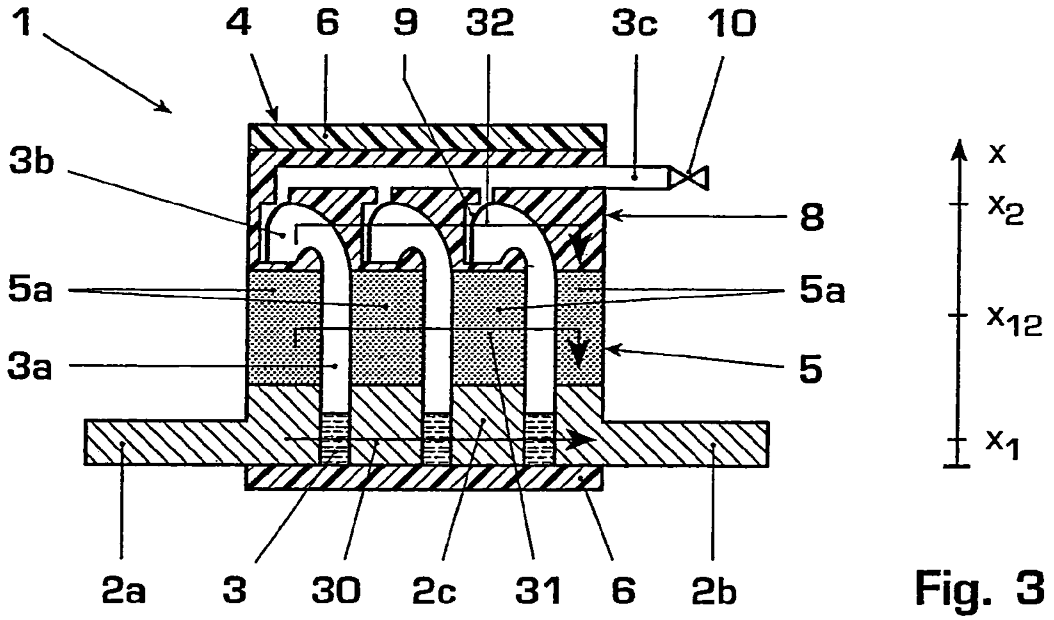
FIGS. 3, 4 show current-limiting switches with catchment mechanisms for liquid metal during rated current operation.

FIG. 3 shows a variant of the current limiter 1 in which a catchment container 3*b* is provided in order to hold the liquid metal 3 and in order to provide an isolation path 32 for current disconnection. Furthermore, as illustrated, a supply 3*c* for liquid metal 3 may be provided in order to fill the channels 3*a* with liquid metal 3 and for reconnection of the apparatus 1. Furthermore, in addition to the rated current path 30 and in addition to the current limiting path 31, an isolation path 32 may be provided, on which the webs 5*a* for current limiting merge into webs 8*a* for current isolation. The isolation webs 8*a* are composed essentially of insulation material, are preferably arranged in the area of the catchment container 3*c*, and, together with the channels which have been emptied of liquid metal 3 that has been caught, form the isolation path 32.

Figure 4:
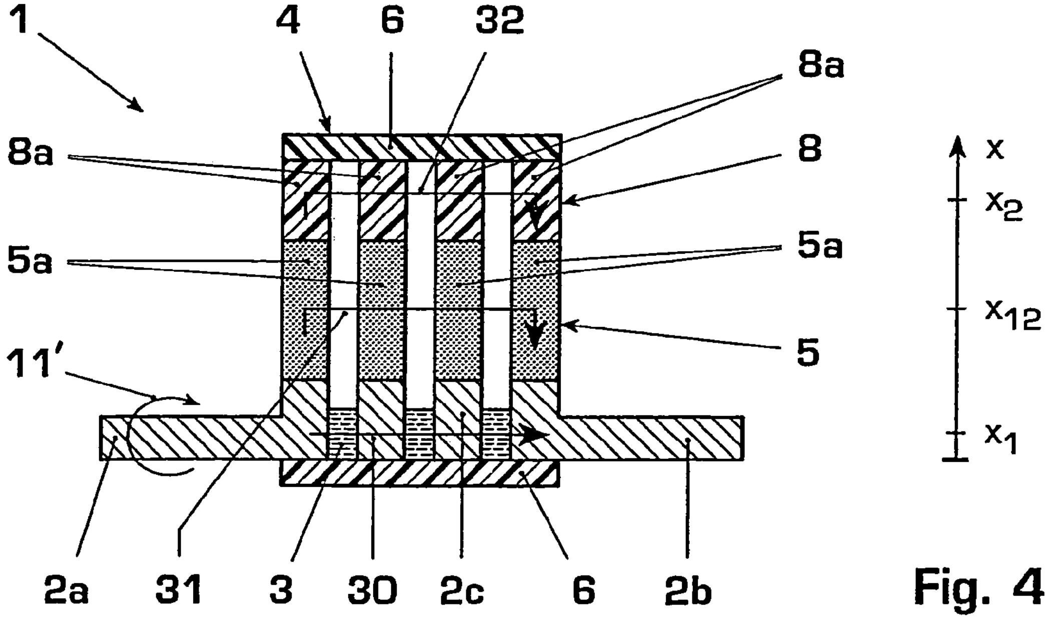

FIG. 4 shows a further variant, in which the isolation path 32 has no catchment container 3*b*. In this case, the drive mechanism for the liquid metal 3 is provided by a rotation drive 11' for the current limiter 1. In the second operating state, the apparatus 1 is rotated at a predeterminable rotation speed such that the equilibrium between friction forces and capillary forces on the one hand and the centrifugal force on the other hand results in the liquid metal 3 assuming a second position $x_{12}$ in the area of the resistance element 5, and forming a current limiting path 31. By increasing the rotation speed and thus the centrifugal force, the liquid metal 3 is forced into the area of the isolation webs 8*a*, and, together with them, forms the isolation path 32. Since the liquid metal is conductive, the isolation webs 8*a* are subject to more stringent dielectric strength requirements, and this is achieved, for example, by broader isolation webs 8*a* and/or a suitable choice of material.

Thus, in both variants, the liquid metal 3 can move between the rated current path 30, the current limiting path 31 and the isolation path 32 for current disconnection, thus resulting in an integrated current-limiting switch 1 based on liquid metal. The first current path 30 for the operating current $I_1$, the second current path 31 for current limiting and, in particular, the isolation path 32 are arranged essentially at right angles to the movement direction x and/or essentially parallel to one another. This is achieved by a particularly simple configuration for an integrated current limiter-circuit breaker 1, which operates exclusively with liquid metal 3.

Figure 5:
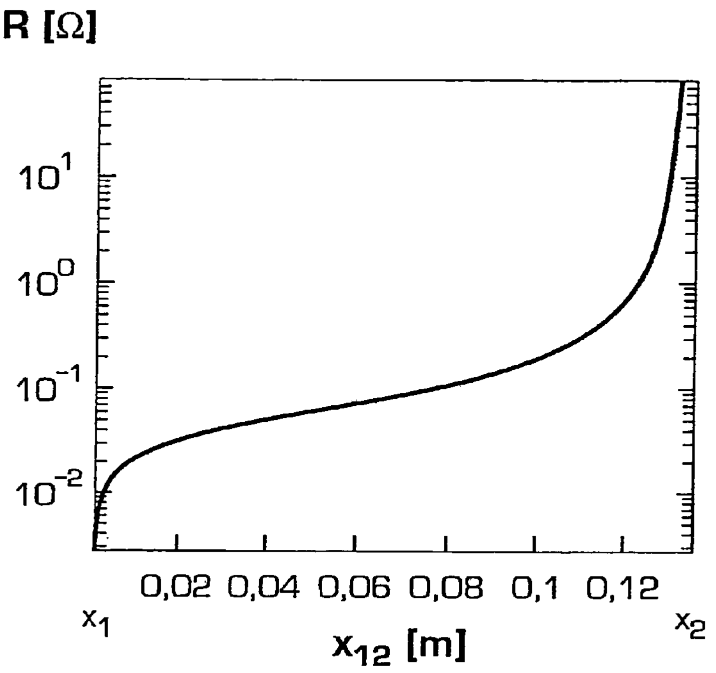
FIG. 5 shows a curve illustrating the variation of the resistance of the current limiter as a function of the position of the liquid metal column.

FIG. 5 shows a design of the electrical resistance $R_x$ as a function of the second position $x_{12}$ of the liquid metal 3 for the current limiter 1 or current-limiting switch 1. The resistance $R_x$ is advantageously chosen such that it rises non-linearly to a maximum value $R_x(x_2)$ at an extreme second position $x_2$. The maximum value $R_x(x_2)$ of the resistance $R_x$ should also be designed for a given voltage level on the basis of a current $I_2$ to be limited to a finite value or to a dielectric isolation value for disconnection of the operating current $I_1$.

The electrical resistance $R_x$ as a function $R_x(x_{12})$ of the second position $x_{12}$ and a distance/time characteristic $x_{12}(t)$ of the liquid metal 3 along the movement direction x should be chosen such that the product of the electrical resistance $R_x$ and current $I_2$ in every second position $x_{12}$, $x_2$ of the liquid metal 3 is less than the arc striking voltage $U_b$ between the liquid metal 3 and the solid electrodes 2*a*, 2*b* and intermediate electrodes 2*c*, and/or so as to achieve a sufficient current limiting gradient to cope with network-dependent short-circuit currents i(t).

A current limiting resistance $R_x$ which is dependent on the electrical network parameters and the breakdown response of the contacts 2*a*, 2*b* to be disconnected is necessary in order to cope with short circuits. The greater the gradient of the short-circuit current i(t), the lower $R_x$ must be chosen to be. In the worst case, the maximum short-circuit current amplitude and the maximum short-circuit current inductance must be assumed. In this case:

$$R_x(t)\cdot i(t)<U_b(t) \qquad (G1)$$

$$R_x(t)\cdot i(t)+L\cdot di/dt(t)=U_N(t) \qquad (G2)$$

where t is a time variable, L is the network inductance in the event of short circuit, $U_N$ is the operating or rated voltage, d/dt is the first derivative and $d^2/dt^2$ is the second time derivative. The equation (G2) is based on the assumption that the resistance in the network is $R_{Network}<<L$ and that the network voltage $U_N$ is maintained in the event of a short circuit. Furthermore, the equation of motion (G3) applies for the liquid metal 3 with the mass m, the position of deflection $x_{12}(t)$, the coefficient of friction α and the drive force F $$m\cdot d^2x_{12}/dt^2+\alpha\cdot dx_{12}/dt(t)=F-F_r, \qquad (G3)$$

where $F_r$ is the restoring force and, in particular, is equal to the gravitational force $F_r=m\cdot g$ where g is the acceleration due to gravity on earth. By way of example FIG. 5 was based on the assumption of an electromagnetic force $F=F_{mag}$ which is exerted on the liquid metal 3 as a result of the self-interaction of the current i(t) flowing through it. Then, in addition, $$F=k\cdot i^2(t) \qquad (G4)$$

where k is a proportionality constant that is dependent on the geometry. For an external magnetic field B, F=k'·i(t) where k' is a further proportionality constant. In the case of a mechanical drive, F is the mechanically produced pressure force on the liquid metal 3 which may be chosen, for example for open-loop or closed-loop control purposes, as a function of the current i(t) to be disconnected or of an overcurrent i(t).

FIG. 5 is based, for example, on the following assumptions: a current gradient $U_N$=1 kV, $I_1$=1 kA, di/dt=15 kA/ms which is dependent on a short circuit, maximum short-circuit current $I_2$=50 kA and plausible parameter values for k, m and α. The resistance $R_x(t)$ is then obtained by solving the equations (G2)–(G4) subject to the constraint (G1), and the distance/time characteristic $x_{12}(t)$ of the liquid metal 3 is then obtained and, finally, the resistance $R_x(x_{12})$ is obtained by elimination of the time dependency as a function of the second position $x_{12}$, as illustrated logarithmically in FIG. 5. Starting from the first position $x_1$, that is to say when the liquid metal 3 is detached from the solid electrodes 2*a*, 2*b*, 2*c*, $R_x$ initially rises more than proportionally with the second position $x_{12}$, then rises linearly in a phase in which the energy stored in the network inductance L must be absorbed, and then merges again into a steeper, that is to say more than proportional, rise $R_x(x_{12})$ in a range in which the current i is already limited and greater $R_x$ are tolerable.

A resistance $R_x$ such as this which rises non-linearly with the distance traveled x may, for example, be achieved by materials with different resistivities. An overall resistance $R_x$ which rises non-linearly can also be achieved by suitable geometric guidance of the current path in a resistance element with a homogeneous resistivity. The non-linear graduation of the resistance Rx can also be achieved by a combination of the two measures, specifically by means of suitable geometric current guidance in a resistance element with a variable resistivity.

FIG. 6 shows a combined liquid metal current limiter 1 and liquid metal circuit breaker 1 with a gas drive 12 for the liquid metal 3. When the liquid metal 3 is moved in the positive movement direction +x, the current i is carried on the current limiting path 31, and is limited as discussed above. Alternatively, the liquid metal 3 can be moved in a third operating state along the opposite movement direction −x to at least one third position $x_{13}$, $x_3$, with the liquid metal 3 being connected in series with an isolator 8 in the at least one third position $x_{13}$, $x_3$ and thus forming an isolation path 32 for power disconnection by means of the apparatus 1. As illustrated, the isolation path 8 may be formed by a plurality of isolation webs 8*a* which, in the case of disconnection, are alternately connected in series with the liquid metal columns 3 that have been shifted downwards. In particular, the third operating state is initiated by a disconnection command, with the liquid metal 3 being moved by an electromagnetic drive with a switchable external magnetic field B or by a mechanical drive with a dielectric fluid 12. By way of example, FIG. 6 shows a gas drive 12, in which a first gas pressure container 121, with a volume V, of gas at a pressure $P_1$, and a second gas pressure container 122, with a volume $V_2$ of gas at a pressure $p_2$, communicate in each gas via a controllable gas pressure valve 13 with the working pressure container 123 with the working volume $V_3$ and the working pressure $p_3$. It is also possible to provide a combined valve, that is to say a three-way valve, instead of two separate valves 13. By the choice of appropriate pressures, for example $p_1<p_2$, and the activation of the valves 13, it is possible to switch deliberately in both directions between the first, the second and the third operating state. By way of example, for current limiting 31, gas flows out of 121 at a pressure $p_1$ into the working volume $V_3$, and the liquid metal columns 3 rise to $x_{12}$ or $x_2$. For rated current operation 30, gas flows out of 122 at times, and the liquid metal level falls to x=0. For power disconnection 32, the container 122 at the pressure $P_2$ is opened, and the liquid metal 3 falls to the third position $x_{13}$, or to the extreme third position $x_3$. The gas enclosed in the enclosure volume 124 produces a restoring spring force. Further details and variants of the gas drive 12, for example three pressure containers with three different pressures for in each case one of the three operating states and, in particular, a connection of the volume 124 to a pressure container, are possible and are hereby also intended to be expressly included. Alternatively or in addition to the pressure containers 121, 122, the liquid metal drive can also be designed to be magnetic with an external or internal magnetic field B, or to be mechanical with a piston or pistons. Alternatively or in addition to the gas, it is also possible to use a different dielectric working fluid, for example oil. By way of example, mercury, gallium, cesium, GaInSn or the like are suitable for use as the liquid metal 3.

The isolation path 32 for current disconnection is advantageously arranged above the second current path 31 and/or below the first current path 30. This results in a compact arrangement of the liquid metal 3 and of its drive mechanism 12 relative to the currents to be switched, in particular relative to the rated current path 30, the current limiting path 31 and, if appropriate, the current disconnection path 32. The current limiter 1 in FIG. 6 can also be in the form of a current-limiting switch 1, as described.

Applications of the apparatus 1 relate, inter alia, to use as a current limiter, current-limiting switch and/or circuit breaker 1 in electricity supply networks, as a self-recovering protective device or as a motor starter. The invention also covers an electrical switchgear assembly, in particular a high voltage or medium-voltage switchgear assembly, characterized by an apparatus 1 as described above.

LIST OF REFERENCE SYMBOLS

1 Liquid metal current limiter

2*a*, 2*b* Solid metal electrodes, metal plates

2c Intermediate electrodes
20 Current supply, current conductor
3 Liquid metal
3a Channels for liquid metal
3b Catchment container for liquid metal
3c Supply for liquid metal
30 Current path for the operating current, first current path
31 Current path for current limiting, second current path
32 Current interruption path, isolation path
4 Liquid metal container
5 Resistance element for current limiting, Resistance matrix for liquid metal
5a Individual resistances
6 Isolator, container cover, housing wall
7 Switch, circuit breaker
8 Isolator for current interruption
8a Individual isolators
9 Flexible membrane
10 Valve for liquid metal supply
11 Drive controller, magnetic field controller
11' Rotation movement
12 Gas drive for liquid metal
121–124 Gas pressure container
13 Gas pressure valves
$\alpha$ Coefficient of friction
B Magnetic field
$F_{mag}$ Magnetic force
$F_r$ Restoring force
I Current
$I_1$ Operating current
$I_2$ Limited overcurrent
k Proportionality constant
L Network inductance
$P_1$, $P_2$, $P_3$ Gas pressure
$R_x$ Resistance of the current limiter
t Time variable
$U_b$ Arc striking voltage
$U_N$ Network voltage, operating voltage
$V_1$, $V_2$, $V_3$ Gas volumes
x, $x_1$, $x_2$, $x_{12}$, $x_3$, $x_{13}$ Position of the liquid metal column It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method for current limiting, in particular in electrical power supply networks, having a current limiting apparatus which has solid electrodes and a container with at least one channel for a liquid metal, in which an operating current is carried on a first current path through the current limiting apparatus between the solid electrodes and the first current path is at least partially passed through the liquid metal, which is located in a first position, in a first operating state, in which the liquid metal is moved along a movement direction to at least one second position in a second operating state, and is passed along a resistance element during the transition from the first position to the second position, and is connected in series with the resistance element in the at least one second position and in consequence a current-limiting second current path is formed through the current limiting apparatus and has a predeterminable electrical resistance, wherein:

a) the resistance element is purely resistive, and the electrical resistance, in order to achieve a soft disconnection characteristic, rises non-linearly and continuously with the second position, wherein b) in logarithmic representation, the electrical resistance as a function of the second position first of all increases more than proportionally with the second position and then rises linearly with the second position in a phase in which the energy which is stored in a network inductance must be absorbed, and then, in a region in which the short-circuit current is already limited and greater electrical resistances are tolerable, changes once again to a more than proportionally rising function of the second position.

2. The method as claimed in claim 1, wherein:

the electrical resistance is chosen as a function of the second position, and the distance/time characteristic of the liquid metal along the movement direction is chosen such that a) in every second position of the liquid metal, the product of the electrical resistance and of the current is less than an arc striking voltage between the liquid metal and the solid electrodes and intermediate electrodes, and b) an adequate current limiting gradient is achieved to cope with network-dependent short-circuit currents.

3. The method as claimed in claim 1, wherein:

a) the movement direction of the liquid metal is predetermined by a height extent of the at least one channel, and/or b) the current-limiting second current path runs essentially at right angles to a height extent of the at least one channel and at a variable height which can be predetermined by the second position of the liquid metal.

4. The method as claimed in claim 1, wherein:

a) a plurality of channels are arranged essentially parallel to one another and are separated from one another by wall-like webs, b) in which the webs form individual resistances of the resistance element, and the current-limiting second current path is formed by alternating series connection of the channels and of the individual resistances, and c) in particular, in that the webs have intermediate electrodes for the operating current to pass through at the same height as the solid electrodes.

5. The method as claimed in claim 1, wherein:

a) the electrical resistance rises to a maximum value at an extreme second position, and/or b) for a given voltage level, a maximum value of the electrical resistance is designed to have a finite value on the basis of a current to be limited, or is designed to have a dielectric isolation value for disconnection of the operating current.

6. The method as claimed in claim 1, wherein:

a) the second operating state is initiated by an overcurrent and/or b) the current limiting is activated autonomously, in particular by electromagnetic force which acts on the liquid metal through which current is flowing, with the liquid metal being arranged in an external magnetic field or in an internal magnetic field which is produced by a current supply.

7. The method as claimed in claim 1, wherein in a third operating state, a) the liquid metal is moved along an opposite movement direction to at least one third position, and b) the liquid metal is connected in series with an isolator when in the at least one third position, thus forming an isolation path for power disconnection by the apparatus, and c) in particular in that the third operating state is initiated by a disconnection command and the liquid metal is moved by an electromagnetic drive with a switchable external magnetic field, or by a mechanical drive with a dielectric fluid, in particular by a gas drive.

8. An apparatus for current limiting, having solid electrodes and a container with at least one channel for a liquid metal, in which a first current path for an operating current is provided through the current limiting apparatus between the solid electrodes in a first operating state, and the first current path passes at least partially through the liquid metal which is located in a first position, in which electrical resistance means with a predeterminable electrical resistance are provided, positioning means are provided for movement and for spatial positioning of the liquid metal along a movement direction along the resistance means to at least one second position, and the liquid metal is connected at least partially in series with the resistance means in a second operating state, and forms a second current path together with it, on which the operating current can be limited to a current to be limited, wherein:

a) the resistance element is purely resistive, and the electrical resistance, in order to achieve a soft disconnection characteristic, rises non-linearly and continuously with the second position, wherein b) in logarithmic representation, the electrical resistance as a function of the second position first of all increases more than proportionally with the second position and then rises linearly with the second position in a phase in which the energy which is stored in a network inductance must be absorbed, and then, in a region in which the short-circuit current is already limited and greater electrical resistances are tolerable, changes once again to a more than proportionally rising function of the second position.

9. The apparatus as claimed in claim 8, wherein the electrical resistance is designed to be a function of the second position and the positioning means have a distance/time characteristic of the liquid metal along the movement direction such that a) in every second position of the liquid metal, the product of the electrical resistance and of the current is less than an arc striking voltage between the liquid metal and the solid electrodes and intermediate electrodes, and b) an adequate current limiting gradient is achieved to cope with network-dependent short-circuit currents.

10. The apparatus as claimed in claim 8, wherein a) the resistance means have a dielectric matrix which has wall-like webs for dielectric isolation of the channels for the liquid metal, and the webs have a dielectric material with a resistance which increases non-linearly in the movement direction, and the webs have intermediate electrodes for electrically conductive connection of the channels at the height of the first position of the liquid metal, and/or b) a catchment container is provided for holding the liquid metal and for provision of an isolation path for current disconnection, and/or c) a supply for liquid metal is provided in order to fill the channels with the liquid metal and in order to reconnect the apparatus.

11. The apparatus as claimed in claim 8, wherein the positioning means comprise the channels and a drive means for the liquid metal, in particular an electromagnetic drive or a mechanical drive with a dielectric fluid, by means of which the liquid metal can be moved between the first current path for the operating current and the second current path for current limiting, and in particular an isolation path for current disconnection.

12. The apparatus as claimed in claim 8, wherein:

a) the first current path for the operating current, the second current path for current limiting and, in particular, an isolation path for current disconnection are arranged essentially at right angles to the movement direction and/or essentially parallel to one another, and/or b) at least one isolation path for current disconnection is arranged above the second current path and/or below the first current path.

13. An electrical switchgear assembly, in particular high-voltage or medium-voltage switchgear assembly, comprising an apparatus as claimed in claim 8.

* * * * *